United States Patent [19] [11] 3,721,306
Sartor [45] March 20, 1973

[54] PRESSURE EQUALIZING SYSTEM FOR ROCK BITS
[75] Inventor: Raymond Watkins Sartor, Dallas, Tex.
[73] Assignee: Dresser Industries, Inc., Dallas, Tex.
[22] Filed: Nov. 24, 1971
[21] Appl. No.: 201,733

[52] U.S. Cl. .................... 175/228, 175/339, 308/8.2
[51] Int. Cl. .............................................. E21b 9/10
[58] Field of Search ........................................ 308/8.2; 175/227–229, 337, 339, 340

[56] References Cited

UNITED STATES PATENTS

| | | | |
|---|---|---|---|
| 3,476,195 | 11/1969 | Galle | 175/228 |
| 3,127,942 | 4/1964 | Neilson | 175/337 |
| 3,137,508 | 6/1964 | Cunningham | 308/8.2 |

*Primary Examiner*—David H. Brown
*Attorney*—Eddie E. Scott et al.

[57] ABSTRACT

A cone cutter is rotatably mounted upon a bearing shaft extending from the arm of a sealed bearing rotary rock bit. An open ended conduit extends through the arm of the bit and a lubricant reservoir is positioned within the arm of the bit encircling the conduit. A flexible diaphragm is positioned between the lubricant reservoir and the conduit to provide pressure equalization of lubricant in the lubricant reservoir and fluid in the well bore. Ports in the wall of the conduit transmit pressure from the fluid in the well bore to the flexible diaphragm. Movement of the flexible diaphragm is limited by the wall of the conduit in one direction and by a perforated cylindrical canister mounted in the lubricant reservoir in the opposite direction. A lubricant passageway extends from the lubricant reservoir to bearings between the cone cutter and the bearing shaft to transmit lubricant from the lubricant reservoir to the bearings.

10 Claims, 3 Drawing Figures

PATENTED MAR 20 1973  3,721,306

PRESSURE EQUALIZING SYSTEM FOR ROCK BITS

BACKGROUND OF THE INVENTION

The present invention relates to the art of earth boring and, more particularly, to a system for providing lubricant to the bearings between the cutter and the bearing shaft of a sealed bearing rotary rock bit to allow the bit to be operated for an extended period of time under changing environmental conditions.

A sealed bearing rotary rock bit, in general, consists of a main bit body adapted to be connected to a rotary drill string. The bit includes at least one rotatable cone cutter mounted upon a bearing shaft extending from the main bit body. Bearing systems are provided between the cone cutter and the bearing shaft to promote rotation of the cutter and means are provided on the outer surface of the cone cutter for disintegrating the formations as the bit and the cutter rotate. A sufficient supply of lubricant must be provided to the bearing systems throughout the lifetime of the bit.

Problems have been encountered with prior art systems of supplying lubricant to the bearings because of the relatively long lifetime of modern bits and the wide variation of environmental conditions encountered during the drilling operation. When a sealed bearing rotary rock bit is lowered into a well bore, the environmental pressure surrounding the bit increases at the rate of approximately ½ pound per square inch for each foot of depth. This means that at a depth of 10,000 feet the hydrostatic pressure on the outside of the bit could be 5,000 psi or more because of the weight of the drilling fluid in the well bore above the bit. In order for a lubrication system to function properly at the elevated down hole pressures, some means must be provided to equalize the internal pressure of the lubricant in the lubrication system with the hydrostatic pressure of the drilling fluid in the well bore. Pressure equalization has previously been accomplished by closing one end of the lubricant reservoir with a flexible membrane and venting the portion of the reservoir on the outer side of the membrane to a port on the surface of the bit. This system has only been partially successful because the membrane tends to rupture under large pressure differentials and the vent tends to become plugged with materials from the well bore.

A wide variety of other environmental conditions also affect the performance of a pressure equalizing system. For example, the temperature will rise as the well bore penetrates deeper into the earth and temperatures of up to 325° F are presently being encountered. Deep wells now being drilled are expected to result in environmental temperatures of up to 400° F and the drilling of steam wells result in environmental temperatures as high as 550° F. The elevated temperature has an adverse effect on the lubricant, the structural elements of the lubrication system and the structural elements of the pressure equalizing system. The heat produces a substantial increase in the pressure of the lubricant within the lubricant reservoir.

Vacillating pressure conditions, including the magnitude of vacillation, must also be considered when providing a pressure equalizing system. Periodic pressure variations are produced during the drilling operation and these pressure variations can damage the structural elements of the lubrication system and the pressure equalizing system. During drilling, joints of pipe must be added to the drill string for progressively deeper penetration. This may mean that 50 or 60 joints of pipe are added to the drill string during the normal life of a sealed bearing rotary rock bit. In order to add a joint of pipe, which is usually 30 feet in length, rotation of the bit must be stopped and the entire string of pipe, including the bit, must be raised high enough to allow the kelly to clear the rotary table (35–50 feet). Since operating costs of an oil well drilling rig are quite high, the time that the bit is off bottom and not drilling must be kept to a minimum. Therefore, the addition of a joint of pipe must be accomplished quickly and the drill string must be raised and lowered as rapidly as possible. This raising and lowering of the drill string creates pressure variations that affect the lubrication system and the pressure equalizing system.

When the bit is on bottom, the pressure of the lubricant is the same as, or nearly the same as, the hydrostatic pressure of fluid in the well bore. However, as the drill string is elevated in the well bore, the bit body acts in much the same manner as a piston in a cylinder. The enlarged diameter of the bit body exerts a force on the column of fluid above it due to the velocity of the bit traveling up the well bore. In prior art bits, the swabbing action of the bit traveling up the well bore would create high pressure in the area of the reservoir and the high pressure would be transmitted directly to the flexible diaphragm of the prior art pressure equalizing system.

In a substantial number of sealed bearing rotary rock bits, the seals are designed to hold pressure in one direction only, that being from the outside of the bit to the inside. If the pressure on the inside of the bit reaches 50 to 75 psi greater than the pressure on the outside, the seals will in all probability leak. It is therefore quite important that a reliable pressure equalizing system be provided. In other sealed bearing rotary rock bits, seals are used that resist flow in both directions, such as an O-ring seal. This type of bit also requires a pressure equalizing system because a substantial pressure build up within the lubrication system may be encountered. Some of the potential sources of the pressure build up are the pressure differential between lubricant inside of the bit and the fluid in the well bore outside of the bit during raising and lowering of the bit and the elevated temperatures encountered during the drilling operation that cause the lubricant to expand.

BRIEF DESCRIPTION OF THE PRIOR ART

In U.S. Pat. No. 3,370,895 to G. A. Cason, Jr., patented Feb. 27, 1968, a sealed bearing rotary rock bit with a lubricant reservoir is shown. A movable piston is positioned in the lubricant reservoir and the area above the piston is vented to the exterior of the bit to expose the upper side of the piston to the environmental pressure of the well bore. A seal is provided between each of the cutters and the arm upon which they are mounted. The seal retains lubricant in the bearing area and prevents ambient fluid and any entrained materials from entering the bearing area.

In U.S. Pat. No. 3,476,195 to E. M. Galle, patented Nov. 4, 1969, a sealed bearing rotary rock bit is shown that includes a lubricant reservoir and a flexible membrane that encloses one end of the lubricant reservoir for equalizing the internal pressure of lubricant in the lubricant reservoir with the hydrostatic pressure of drilling fluid in the well bore. A check valve is provided which operates at low pressure to permit flow out of the lubricant reservoir to the outside of the bit but blocks any flow in the reverse direction.

SUMMARY OF THE INVENTION

The present invention provides a pressure equalizing system for a sealed bearing rotary rock bit that will withstand a wide range of pressure variations. An open passageway extends through the arm of the bit and a lubricant reservoir is positioned in the arm of the bit proximate the open passage. A flexible diaphragm is positioned between the lubricant reservoir and the open passage to equalize the pressure of lubricant in the lubricant reservoir and the pressure of fluid in the well bore. A lubricant passage extends from the lubricant reservoir to the bearing systems between the cutter and the arm. A seal is positioned between the cutter and the arm to retain lubricant in the area of the bearing systems and to prevent the bearing systems from being contaminated by fluid and materials in the well bore.

It is therefore an object of the present invention to provide an improved pressure equalizing system for a sealed bearing rotary rock bit.

It is a further object of the present invention to provide a lubrication system for a sealed bearing rotary rock bit that will operate effectively under changing pressure conditions.

It is a still further object of the present invention to provide a pressure equalizing system that will extend the useful lifetime of a sealed bearing rotary rock bit.

It is a still further object of the present invention to prevent or at least reduce the amount of drill cuttings and other particles that contact the flexible diaphragm of a pressure equalizing system of a sealed bearing rotary rock bit.

It is a still further object of the present invention to provide a pressure equalizing system for a sealed bearing rotary rock bit that will not become clogged or plugged by materials in the well bore.

It is a still further object of the present invention to reduce the magnitude of pressure variations on the flexible diaphragm of a rock bit pressure equalizing system by connecting the high and low pressure areas of the bit through an open passageway.

It is a still further object of the present invention to provide a pressure equalizing system for a sealed bearing rotary rock bit including a flexible diaphragm that will not rupture under a substantial internal pressure build up.

It is a still further object of the present invention to provide a pressure equalizing system for a sealed bearing rotary rock bit including a flexible diaphragm that will not rupture under a substantial external pressure build up.

The above and other objects and advantages will become apparent from a consideration of the following detailed description of the invention when taken in conjunction with the accompanying drawings.

DETAILED DESCRIPTION OF THE INVENTION

Figure 1:
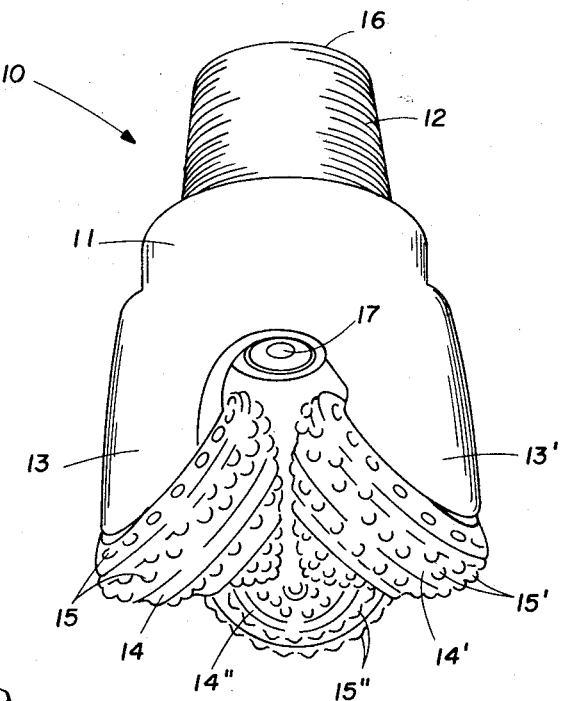
FIG. 1 shows a three cone rotary rock bit constructed in accordance with the present invention.

Referring now to the drawings and to FIG. 1 in particular, shown therein and generally designated by the reference character 10 is a three cone sealed bearing rotary rock bit. As illustrated, the bit 10 includes a bit body 11 including an upper threaded portion 12. The threaded portion 12 allows the bit 10 to be connected to the lower end of a rotary drill string (not shown). Depending from the bit body 11 are three substantially identical arms with two of the arms, 13 and 13', being shown in FIG. 1. The lower end of each of the arms is provided with an extended journal portion and the details of this journal portion will be discussed subsequently. Three rotary cone cutters 14, 14', 14" are rotatably positioned on three bearing pins extending from the arms. Each of the cutters 14, 14', 14" includes cutting structure 15, 15', 15" on its outer surface adapted to disintegrate the formations as the bit 10 is rotated and moved downward. The cutting structure 15, 15', 15" is shown in the form of tungsten carbide inserts. However, it is to be understood that other cutting structures such as steel teeth may be used as the cutting structure on the cone cutters.

The bit 10 includes a central passageway 16 extending along the central axis of body 11 to allow drilling fluid to enter from the upper section of the drill string (not shown) immediately above and pass downward through three jet nozzles, one nozzle 17 being shown in FIG. 1, to the bottom of the well bore. In use, the bit 10 is connected as the lower member of a rotary drill string (not shown) and lowered into a well bore until the cone cutters engage the bottom of the well bore. Upon engagement with the bottom of the well bore, the drill string is rotated, rotating bit 10 therewith. Drilling fluid is forced down through the interior passage of the rotary drill string and continues through the central passageway 16 of bit 10 passing through the nozzles to the bottom of the well bore, thence, upward in the annulus between the rotary drill string and the wall of the well bore carrying with it the cuttings and debris from the drilling operation.

In order to add additional sections of the drill string, the bit 10 is lifted a short distance in the well bore, a new section of drill string is added and the bit 10 lowered until it again reaches the bottom of the well bore and drilling continues. As each section of the drill string is added and the bit is elevated in the well bore, a pressure change is produced at certain areas along the bit. In prior art sealed bearing rotary rock bits, the lubricant would be lost because it was pumped out past the seal or because a structural element of the lubrication system failed. The loss of lubricant, of course, has a deleterious effect on the bearing systems and the bit would be subject to early failure.

Figure 2:
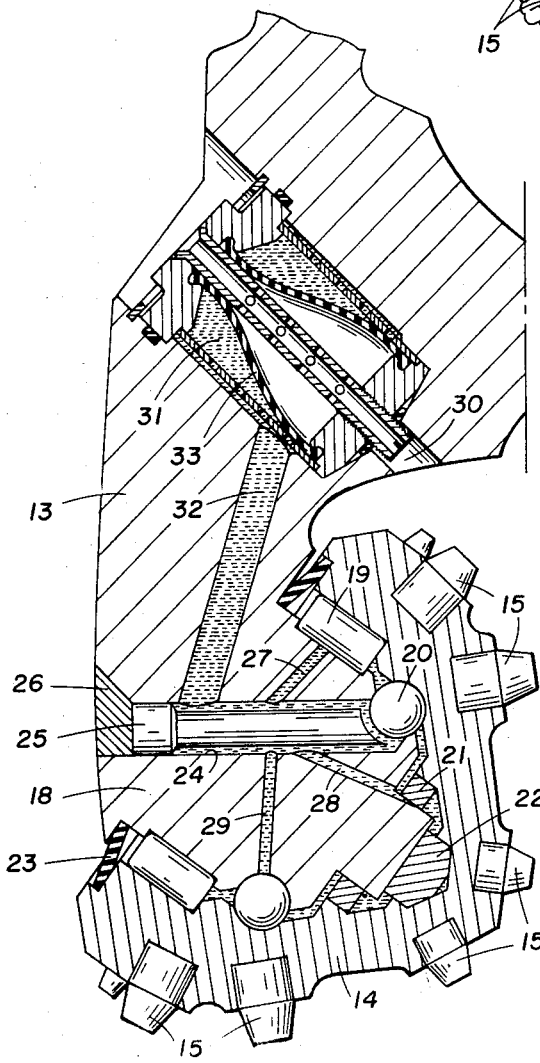
FIG. 2 is a sectional view of one arm of the rock bit of FIG. 1 showing the lubrication system.

Referring now to FIG. 2, a sectional view of one arm 13 of the bit 10 is shown. The cutter 14 is rotatably positioned on the journal portion of the arm 13 and adapted to disintegrate earth formations as the bit is rotated. The cutting structure 15 on the outer surface of cutter 14 contacts and disintegrates the formations in a manner that is well known in the art. The journal portion of arm 13 consists of a bearing pin 18 upon which the cutter 14 is mounted. A plurality of bearing systems are located in the bearing area between the cutter 14 and the bearing pin 18. The bearing systems in the bearing area include a series of roller bearings 19, a series of ball bearings 20, a friction bearing 21 and a thrust button 22. A seal 23 is positioned between the cutter 14 and the bearing pin 18. This seal retains lubricant in the bearing area around the bearing systems and prevents any materials in the well bore from entering the bearings. A passage 24 is provided to allow lubricant to be transmitted to the bearing systems. The passage 24, as shown, allows the balls that make up the ball bearing system 20 to be inserted into position after the cone cutter 14 is placed on the bearing pin 18. The series of ball bearings 20 serves to lock the cone cutter 14 on bearing pin 18. After the balls are in place, a plug 25 is inserted into the passageway 24 and welded therein by weld 26. Plug 25 has a reduced diameter throughout the major portion of its length to allow lubricant to be transmitted to the bearing systems. Additional passages 27, 28 and 29 extend from passage 24 to the bearing area to insure a sufficient supply of lubricant to bearings 19, 20, 21 and 22.

The seal 23 is designed to hold pressure in one direction only, that being from the fluid in the well bore to the bearing area. If the pressure of the lubricant in the bearing area exceeds the pressure of fluid outside of the bit by 50 psi or more, lubricant may be forced out past seal 23 into the well bore. In prior art rotary rock bits, the lubricant pressure inside of the bit would build up periodically resulting in pressure pulses forcing lubricant out past the seal. Temperature changes were also encountered that would lead to pressure build up with an associated loss of lubricant resulting in early bearing failure.

An open passage 30 extends through the upper portion of arm 13. This passage 30, as shown, extends from an area on the outside of the bit above the largest diameter portion of the bit to an area on the bit past the largest diameter portion of the bit. A reservoir 31 is provided in the arm 13 of the bit surrounding the passage 30. Lubricant in the lubricant portion of the reservoir 31 is transmitted through the lubricant passage 32 to passage 24 and to the bearing systems. Lubricant may therefore be transmitted to the bearings and a sufficient supply of lubricant maintained to allow the bit to run for a long period of time. The pressure of the fluid in the well bore is transmitted to a flexible diaphragm 33 in the reservoir and from the flexible diaphragm 33 to the lubricant to eliminate any pressure differential between the pressure of lubricant in the lubricant portion of the reservoir 31 and the pressure of fluid in the well bore. Fluid in the well bore can enter from either end of the open passage 30 and pass through ports into the pressure equalizing section of the reservoir 31. The flexible diaphragm 33 can move in either direction to accommodate pressure changes.

Figure 3:
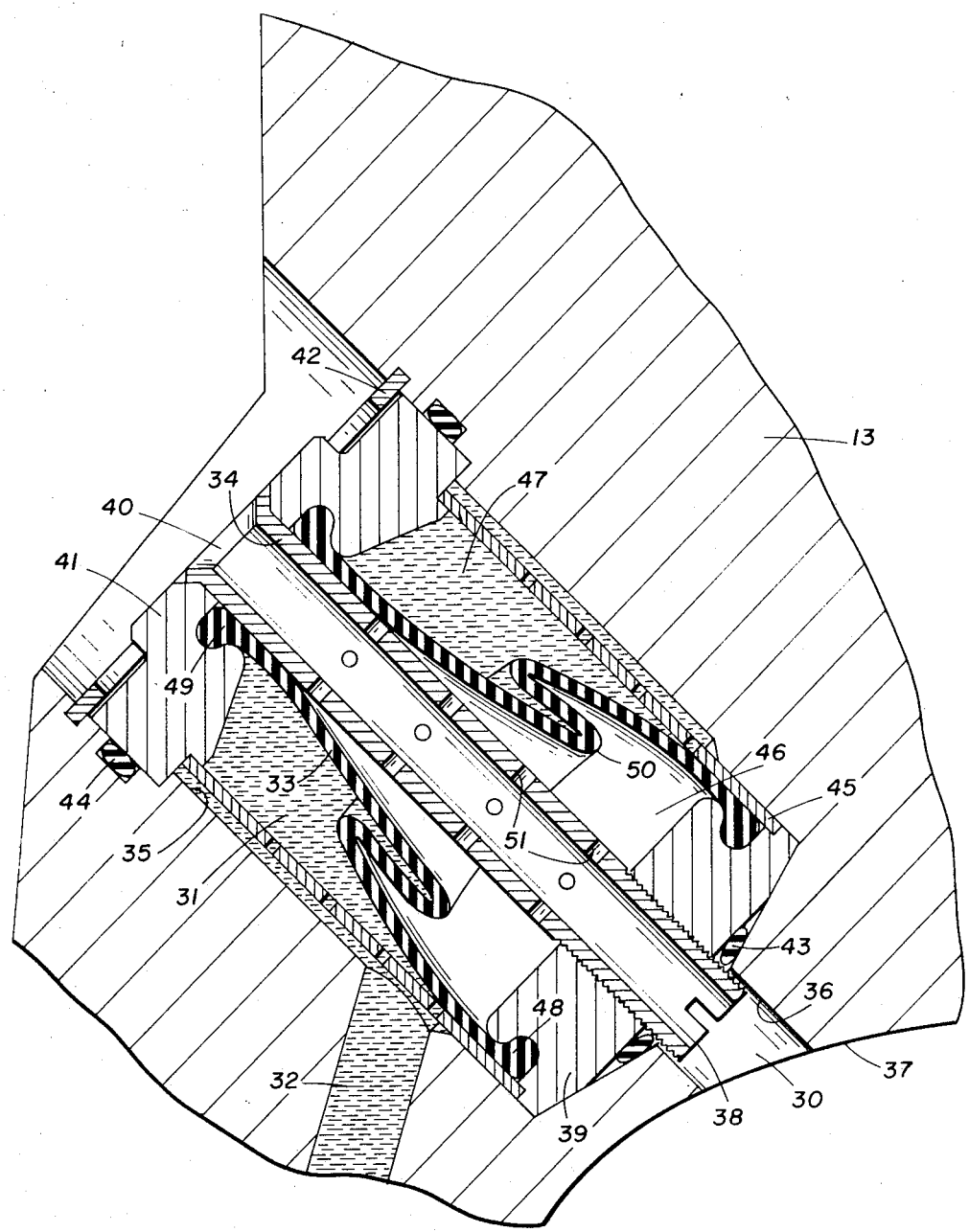
FIG. 3 is an enlarged view of the pressure equalizing portion of the lubrication system shown in FIG. 2.

Referring now to FIG. 3, an enlarged view of the reservoir 31 and the open passage 30 is shown. The passage 30 extends through the central opening of a hollow metal tube 34. The hollow metal tube 34 is positioned in a large diameter bore 35 that extends into the arm of the bit. The bore 35 has a diameter substantially larger than the outside diameter of the metal tube 34 thereby providing an annular space between the outside of the metal tube 34 and the wall of the bore 35. The bore 35 does not extend entirely through the arm 13. A small diameter bore 36 having a diameter approximately the same as the outside diameter of the metal tube 34 extends from the lower end of the large diameter bore 35 to the dome 37 of the bit. The metal tube 34 is positioned in the large diameter bore 35 with one end extending into the small diameter bore 36.

The lower end 38 of the metal tube 34 is threaded and adapted to engage the internal threads of a hole that extends through an inner reservoir cap 39. The inner reservoir cap 39 is positioned proximate the lower end of the large diameter bore 35. The upper end 40 of the metal tube 34 extends through a central opening in an outer reservoir cap 41. The outer reservoir cap 41 is locked in the large diameter bore 35 by a retainer element 42 that snaps into a groove in the large diameter bore 35. An inner seal 43 is positioned between the inner reservoir cap 39 and the lower end of the large diameter bore 35 to prevent ingress and egress of fluids and an outer seal 44 is positioned between the outer reservoir cap 41 and the wall of the large diameter bore 35 to prevent ingress and egress of fluids. A perforated canister reservoir sleeve 45 is positioned between the inner reservoir cap 39 and the outer reservoir cap 41. The flexible diaphragm 33 consists of an annular flexible rubber element surrounding the metal tube 34 and dividing the reservoir 31 into a pressure equalizing section 46 and a lubricant section 47. The inner end 48 of the diaphragm 33 is firmly connected to the external surface of the inner reservoir cap 39 and locked in place by the lower end of the perforated canister reservoir sleeve 45. The outer end 49 of the diaphragm 33 is firmly connected to the internal surface of the central opening that extends through outer reservoir cap 41 and locked in place by the upper end of metal tube 34. Lubricant within the lubricant section 47 of the reservoir 31 is thereby retained within the bit and fluids from the well bore are excluded from the lubrication system. The diaphragm 33 is large enough to allow the diaphragm to move from a position where it is in contact with the entire length of the perforated canister reservoir sleeve to a position where it is in contact with the length of the metal tube 34 from the inner reservoir cap 39 to the outer reservoir cap 41. When the flexible diaphragm 33 is in an intermediate position, it folds back upon itself with a central fold 50. Internal pressure of the lubricant can move the flexible diaphragm 33 toward the metal tube 34 and external pressure of fluid in the well bore entering through the open passage 30 and the series of ports 51 in the metal tube 34 can move the flexible diaphragm 33 toward the perforated canister reservoir sleeve 45.

As shown in FIG. 2, the lubricant passageway 32 extends from the lubricant section 47 of the reservoir 31 to the passageway 24 that is in communication with the bearing systems. A supply of lubricant is maintained to insure that the bearing systems are adequately lubricated throughout the lifetime of the bit. In order to prevent damaging pressure differentials from occurring between the lubricant and fluid in the well bore, the flexible diaphragm 33 may move in response to changes in pressure of either the lubricant or the fluid in the well bore. Movement of the flexible diaphragm 33 is limited by the metal tube 34 in one direction and the perforated canister reservoir sleeve 45 in the other direction. If the pressure change in either direction exceeds the amount provided for by movement of the flexible diaphragm, it will be prevented from rupturing by the reinforcement provided by the metal tube 34 or the sleeve 45. Therefore, the lubrication system of the present invention can absorb pressure differentials of a greater magnitude than were absorbed by systems of the prior art.

The magnitude of pressure differentials imposed upon the flexible diaphragm 33 by movement of the bit 10 up and down in the well bore is substantially less than with systems of the prior art. The open passage 30 connects the high and low pressure areas of the bit during movement either up or down in the well bore. Fluid in the well bore enters the open passageway 30 and moves toward the lower pressure side of the bit 10. Flow in either direction is reduced in pressure before acting on the flexible diaphragm 33. Any cuttings or debris entrained in the fluid is restrained from coming into contact with the flexible diaphragm. The cuttings and debris will continue through the open passageway and only a minute amount, if any at all, will enter the pressure equalizing section 46 of the reservoir. Pressure equalizing systems of the prior art would on occasion become damaged by the interaction of cuttings and debris in the well bore with the elements of the prior art lubrication system. The present invention reduces contact between the cuttings and debris in the well bore and the flexible diaphragm 33. In addition, the open passage 30 is flushed by fluid passing through and is not as subject to being clogged or plugged as readily as prior art systems. When the bit 10 is being moved up the well bore, a high pressure area exists above the enlarged diameter bit body and a low pressure area exists below the enlarged diameter bit body. Fluid flows from the upper end 40 of the metal tube 34 toward the lower end 38 of the metal tube 34. When the bit 10 is being moved downward into the well bore, a high pressure area exists at the dome 37 of the bit and fluid is transmitted from the lower end 38 of the metal tube 34 toward the upper end 40 of the metal tube 34. During the drilling operation, fluid is circulated through the well bore and a constant flow through the open passage 30 is maintained.

The embodiments of the invention in which an exclusive property or privilege is claimed are defined as follows:

1. A drill bit comprising:
  a main bit body, said main bit body including three individual arms and a portion of maximum diameter;
  a rotatable cutter mounted upon each of said arms;
  bearing means between each of said cutters and said arms;
  a seal between each of said cutters and said arms;
  a reservoir in each of said arms;
  a flexible diaphragm in each of said reservoirs dividing said reservoirs into a lubricant portion and a pressure equalizing portion;
  a lubricant passage in each of said arms extending from said lubricant portions of said reservoirs to said bearing means; and
  open passage means in each of said arms in communication with the pressure equalizing portions of said reservoirs for providing pressure equalization to said bit, said open passage means extending from one side of said portion of maximum diameter to the other side of said portion of maximum diameter.

2. The bit of claim 1 wherein said open passage means includes a conduit in each of said arms that provides a passage from one side of said portion of maximum diameter to the other side of said portion of maximum diameter.

3. A rock bit comprising:
  a bit body;
  at least one arm extending from said body;
  a cone cutter mounted upon said arm;
  bearing means between said cone cutter and said arm for promoting rotation of said cutter;
  a seal between said cone cutter and said arm;
  a lubricant reservoir in said arm;
  a flexible diaphragm in said lubricant reservoir dividing said lubricant reservoir into a lubricant portion and a pressure equalizing portion;
  a lubricant passage extending from said lubricant portion of said lubricant reservoir to said bearing means; and
  an open ended pressure equalizing passage extending entirely through said arm, said open ended pressure equalizing passage in communication with the pressure equalizing portion of said lubricant reservoir.

4. The bit of claim 3 wherein said open ended pressure equalizing passage includes an open ended hollow tube in said arm, said tube including ports communicating the inside of said hollow tube with the pressure equalizing portion of said lubricant reservoir.

5. In a rock bit that includes a bit body; at least one arm extending from said bit body, said arm terminating in a bearing shaft; a cone cutter rotatably mounted upon said bearing shaft; bearing means between said cone cutter and said bearing shaft for promoting rotation of said cone cutter upon said bearing shaft; and a seal positioned between the open end of said cone cutter and said bearing shaft, a pressure equalizing system comprising:
  an open passage extending through said arm;
  a reservoir in said arm in communication with said open passage;
  a flexible diaphragm in said reservoir dividing said reservoir into a lubricant portion and a pressure equalizing portion; and
  a lubricant passage communicating the lubricant portion of said reservoir with said bearing means.

6. The pressure equalizing system of claim 5 wherein said open passage is the central opening of a hollow tube.

7. The pressure equalizing system of claim 6 including a series of ports in said hollow tube thereby communicating the central opening of the hollow tube with the pressure equalizing portion of said reservoir.

8. The pressure equalizing system of claim 7 including a perforated element positioned in the lubricant portion of said reservoir.

9. The pressure equalizing system of claim 8 wherein said reservoir completely encircles the open passage and said flexible diaphragm completely encircles said open passage.

10. The pressure equalizing system of claim 9 wherein said perforated element is a perforated cylinder.

* * * * *